Sept. 29, 1970 K. F. RENDLER 3,531,799

PARTICLE REMOVING INPROVEMENT FOR ENCODERS

Filed Dec. 19, 1967

INVENTOR.
KENNETH F. RENDLER

BY Frederick P. Smith

ATTORNEY

United States Patent Office 3,531,799
Patented Sept. 29, 1970

3,531,799

PARTICLE REMOVING IMPROVEMENT FOR ENCODERS

Kenneth Frederick Rendler, La Crescenta, Calif., assignor to Litton Precision Products, Inc., Beverly Hills, Calif., a corporation of Delaware Filed Dec. 19, 1967, Ser. No. 691,766
Int. Cl. G08c *9/08;* H01h *1/60*
U.S. Cl. 340—347 3 Claims

ABSTRACT OF THE DISCLOSURE

An analog-to-digital encoder having uneven surface regions in its tracks to remove undesired material which may accumulate at the point of contact between a sensor and a track.

BACKGROUND OF THE INVENTION

This device pertains to the art of translating analog quantities into digital counterparts. More particularly, it pertains to the art of translating the mechanical rotation of a shaft into coded electrical signals representative of the shaft position. One of the most simple and reliable devices for accomplishing this purpose is the analog-to-digital encoder. In this device, the analog signal, in the form of a shaft rotation, is transformed into a digital output by means of a code disc which has a preselected pattern of binary characters recorded in the tracks thereon. These tracks are electrically energized and have in contact therewith a number of contacts, such as brushes or pins. As the encoder disc rotates in accordance with the analog input, the contacts send out a stream of electrical pulses representative of the binary coded value of the analog input.

As started previously, the prior art devices generally include rotatable elements having a preselected pattern of binary characters thereon which are generally represented by a series of conductive and non-conductive segments placed in tracks on the rotatable elements, and means for sensing the binary characters in each track to produce digital outputs indicative of the position of the rotatable elements relative to the sensing means. In such devices, there commonly occurs a transfer of metal from the conducting segments of a track to the respective contact. The metal transferred is called a "prow," "sliver" or "spur." In high resolution and small diameter encoders, a "prow" can cause a failure in the alignment of contacts on the code disc. Such an alignment failure results in a digital output signal which incorrectly represents the shaft position.

SUMMARY OF THE INVENTION

The present invention overcomes the above and other disadvantages of the analog-to-digital encoders of the prior art by providing an analog-to-digital encoder in which "prows" are removed by causing a contact to traverse a deliberately formed uneven surface region in a track. In general, the encoder of the present invention comprises a code disc with a plurality of tracks composed of discrete conducting and non-conducting segments with each track having a number of uneven surface regions in various non-conducting segments of the track. The uneven surface regions have protuberances and indentations thereon which dislodge any conducting material from the point of contact with a contacting sensor when the uneven surface regions are rotated past the sensor. Thus, by mechanical action, a "prow" is removed before an alignment problem occurs.

It is, therefore, the primary purpose of the invention to provide an improved analog-to-digital encoder free from contact alignment problems caused by conducting material lodging at the point of contact between a contact and a respective track.

BRIEF DESCRIPTION OF THE DRAWINGS

These and other objects of the present invention, together with further features and advantages thereof, will become more apparent from the following detailed specification taken in conjunction with the accompanying drawings. It is to be understood, however, that the detailed specification and the drawings are for the purpose of illustration only and are not to be construed as limitations upon the invention. In addition, reference numerals have been carried forward throughout the figures to designate like parts of the invention.

DESCRIPTION AF THE PREFERRED EMBODIMENT

Figure 1:
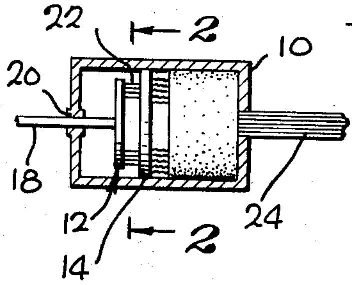
FIG. 1 illustrates, in simplified form, a typical shaft encoder.

In FIG. 1 a simplified shaft encoder is illustrated. The shaft encoder comprises an outer casing 10 which houses an encoder disc 12 and a mounting block 14. Encoder disc 12 is coupled to an input shaft 18 which in turn is supported by ball bearing 20. The rotation of the input shaft 18 is indicative of the analog quantity to be translated into its digital counterpart. Encoder disc 12 has a series of tracks thereon (not shown) which are contacted by contacts 22, supported by the mounting block 14. The contacts 22 function to apply electrical energy to the tracks and to sense the electrical condition of the tracks. Output signals from contacts 22 are transmitted to external circuitry (not shown) by wires 24.

Figure 2:
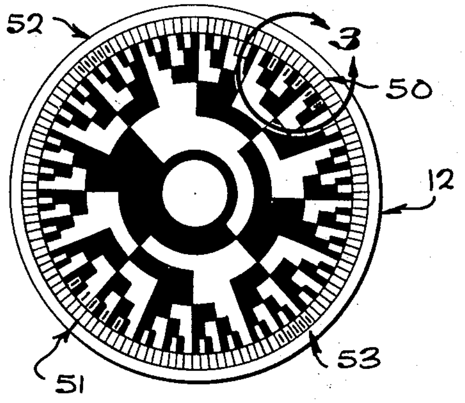
FIG. 2 is a view of a code disc taken at 2—2 of FIG. 1 which illustrates the arrangement of uneven surface regions in the track arrangement of a preferred embodiment of the present invention.

In FIGURE 2 the encoder disc 12 is illustrated having a plurality of tracks thereon in which are positioned one preferred arrangement of the grooves of the present invention. One set of grooves 50 comprises a pair of grooves 49 (shown in detail in FIG. 4) in each of a sequence of five non-conducting segments. A similar set 51 of 5 pairs of grooves is spaced 180 degrees away on the face of encoder disc 12. In the outer track (for the last significant digit) only one groove is used in each non-conducting segment because of the small angular width of each segment in this track. Thus, a third set of grooves 52 comprises a single groove 34 in each of a series of five non-conducting segments. A similar set 53 of five grooves is spaced 180 degrees away in the least significant digit track on encoder disc 12. It is readily apparent that numerous arrangement of grooves can be chosen.

Figure 3:
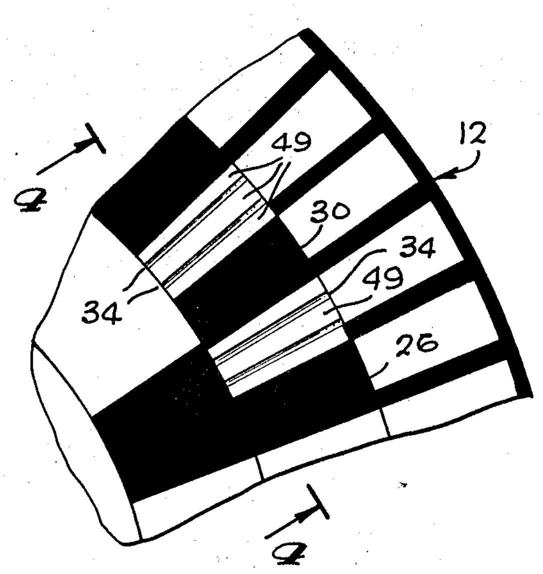
FIGURE 3 is an enlarged view of a section of the code disc of FIG. 2 taken generally in the area of arrow 3 of FIG. 2.

FIG. 3 illustrates in greater detail one pair of grooves 49 in each of two non-conducting segments. As is shown, each pair of grooves 49 comprises two separate grooves 34 spaced a preselected distance from one another.

Figure 4:
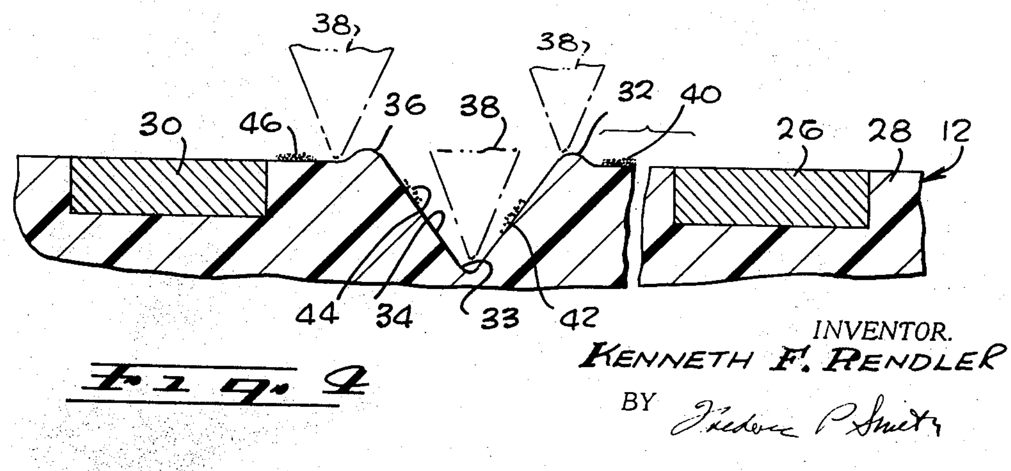
FIG. 4 is a cross-sectional view of one uneven surface region of a track taken at 4—4 of FIG. 3.

FIG. 4 illustrates a cross-sectional view of the groove 34 of the present invention. The protuberances and indentation of the uneven surface region comprising the groove 34 are exaggerated for clarity. Segments 26 and 30 are discrete conducting segments of a track which are separated by non-conducting segments 28. The groove 34 is formed in non-conducting segment 28 to produce protrusion 32, indentation 33 and protrusion 36. Groove 34 is formed, for example, by forcing a tooling pin into non-conducting segment 28 and manually sliding it across the width of the segment. The tooling pin may be a metal pin polished on one end to form a rounded tip having a diameter from 0.003 to 0.004 inch. In the present instance, the diameter of the tip of the tooling pin was selected to be slightly larger than the width of the contact pin to be utilized in the encoder. The tooling pin was inserted into the epoxy at an angle and was forced down into non-conducting segment 28 to a depth from 0.001 to 0.0015 inch and then manually slid across the width of the track. The grooving operation could, of course, be performed by automatic equipment.

The operation of the present invention may be best understood with reference in FIG. 4 which shows in phantom contact 38 in sequential contact with non-conducting segment 28 at three points on the surface of non-conducting segment 28. As the encoder disc is rotated, contact 38 is sequentially lifted by protrusion 32, dropped into indentation 33, and lifted by protrusion 36. The sequence is, of course, reversed for rotation in the opposite direction. Any particle lodged between the point of contact of contact 38 and the face of the encoder disc 12 is scraped away as contact 38 falls into indentation 33. Particles dislodged in this manner are held by a film of silicone lubricating oil (not shown) which covers the face of the encoder disc 12. Most of the minute particles remain on the walls of indentation 33 as, for example, particles 42 and 44 shown in FIG. 4. Some, however, adhere to the surface of non-conducting segment 28 as, for example, particles 40 and 46. The continued presence of such particles throughout the operational life of the encoder does not create a problem as they are on the non-conductive portion of the encoder disc 12.

Having thus described the invention, it is apparent that numerous modifications and departures therefrom may be made by those skilled in the art. The grooves may consist of indentations alone, thus avoiding the step of also forming protrusions. The grooves may also be arranged in numerous different patterns to provide better cleaning action. As such, the invention as described herein is to be construed to be limited only by the spirit and scope of the appended claims.

I claim:

1. An analog-to-digital encoder comprising:

a rotatable element having a plurality of tracks thereon, said tracks having alternatively conducting and non-conducting segments, at least one non-conducting segment having at least one rounded groove formed at a predetermined location, said rounded groove having a longitudinal axis perepndicular to the direction of rotation of said elements;

means for applying electrical energy to said conducting segments of said plurality of tracks; and at least one contact pin contacting each one of said tracks for providing output signals representative of the electrical condiiton of said tracks, said contact pin having a contact tip with a diameter smaller than the width of said rounded groove, and said contact tip intermittently riding in and out of said rounded groove to dislodge any desirable material accumulating at the point of contact with said tracks.

2. A device as claimed in claim 1 further including a protuberance on said non-conducting segment formed at a predetermined location adjacent to said rounded groove, and said contact tip adapted to ride over said protuberance and in and out of said rounded groove.

3. A device as claimed in claim 1 wherein predetermined ones of said segements are provided with at least one of the said rounded grooves.

References Cited

UNITED STATES PATENTS

| | | | |
|---|---|---|---|
| 3,007,067 | 10/1961 | Snyder | 340—347 X |
| 3,100,299 | 8/1963 | Congdon | 340—347 |
| 3,165,732 | 1/1965 | Klosterman | 340—347 |
| 3,250,884 | 5/1966 | Larkin | 200—166 |
| 3,435,446 | 3/1969 | Margolien et al. | 340—347 |

MAYNARD R. WILBUR, Primary Examiner

M. K. WOLENSKY, Assistant Examiner

U.S. Cl. X.R.

200—166